United States Patent
Miller et al.

(10) Patent No.: US 7,731,472 B2
(45) Date of Patent: Jun. 8, 2010

(54) METHOD AND APPARATUS FOR TRANSPORTING A MOTORIZED VEHICLE

(75) Inventors: Ronald E. Miller, Moon Township, PA (US); Joseph O. Nester, Weirton, WV (US)

(73) Assignee: USAirways, Inc., Arlington, VA (US)

( * ) Notice: Subject to any disclaimer, the term of this patent is extended or adjusted under 35 U.S.C. 154(b) by 700 days.

(21) Appl. No.: 11/222,018

(22) Filed: Sep. 9, 2005

(65) Prior Publication Data
US 2006/0104772 A1    May 18, 2006

Related U.S. Application Data

(60) Provisional application No. 60/608,149, filed on Sep. 9, 2004.

(51) Int. Cl.
   *B60P 3/00* (2006.01)
(52) U.S. Cl. ............... 414/537; 414/461; 414/921; 244/137.1; 244/137.4; 14/69.5; 14/70; 206/335
(58) Field of Classification Search ........... 414/537, 414/921, 461; 14/69.5, 70; 244/137.1, 137.4; 206/335
See application file for complete search history.

(56) References Cited

U.S. PATENT DOCUMENTS

| | | | |
|---|---|---|---|
| 3,799,479 A | 3/1974 | Roeder, et al. | |
| 4,527,944 A | 7/1985 | Qually et al. | |
| 5,431,524 A | 7/1995 | Antal et al. | |
| 6,059,521 A | 5/2000 | Rapeli | |
| 6,062,809 A * | 5/2000 | Berkey et al. | 414/809 |
| 6,065,798 A | 5/2000 | Sankrithi | |
| 6,702,542 B1 * | 3/2004 | Chance et al. | 414/347 |

\* cited by examiner

*Primary Examiner*—Michael S Lowe
(74) *Attorney, Agent, or Firm*—Hunton & Williams LLP

(57) ABSTRACT

The present invention provides a method and apparatus for transporting a motorized vehicle, such as a wheelchair, between the loading bridge and cargo bin of an aircraft in a timely manner. According to one embodiment of the invention, a metal cage assembly is implemented with a drop down ramp at the front and an adjustable floor that is raised by a lever handle on either side, outside of the frame. The assembly can be attached to an end of aircraft cargo belt loader by a strap that is wrapped around the belt frame and tightened via a ratcheting clamp. The adjustable floor can be raised or lowered at one end to offset the angle of the belt loader when it is raised to an upright position, for example, to reach a galley door of an aircraft. Angling of the adjustable floor can allow the floor to be substantially parallel to the loading bridge or aircraft cargo bin, thereby enabling the easy transfer of a motorized wheelchair to and from various compartments of the aircraft. The present invention can eliminate injuries to employees, prevent damage to the customer's motorized wheelchair and provide prompt service to physically impaired airline customers.

6 Claims, 5 Drawing Sheets

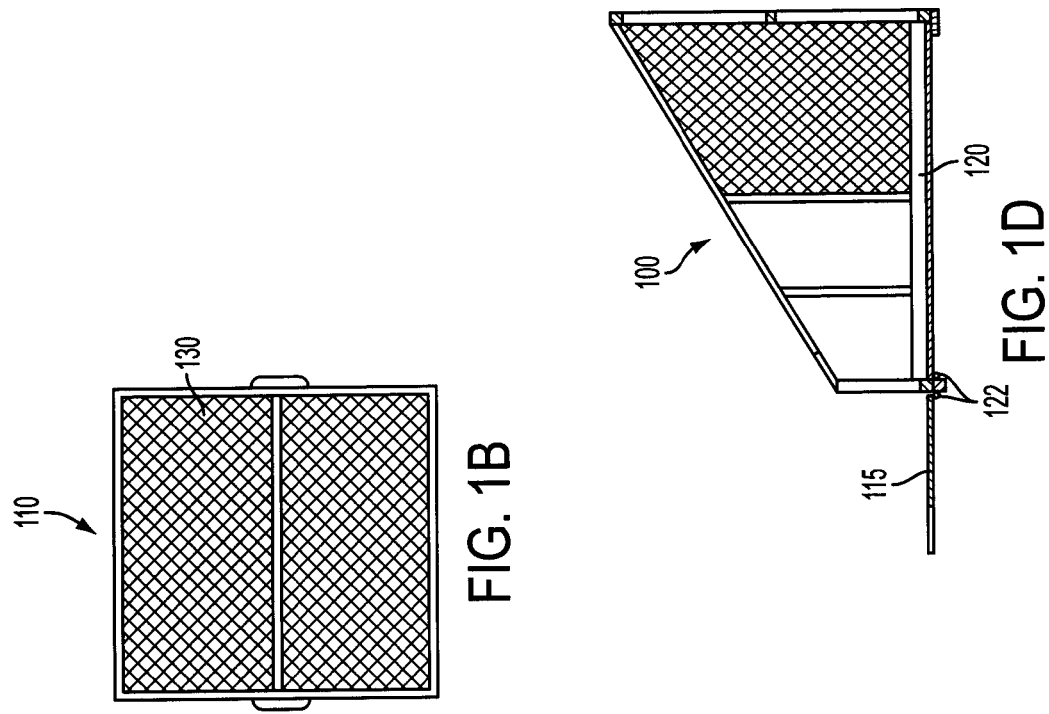
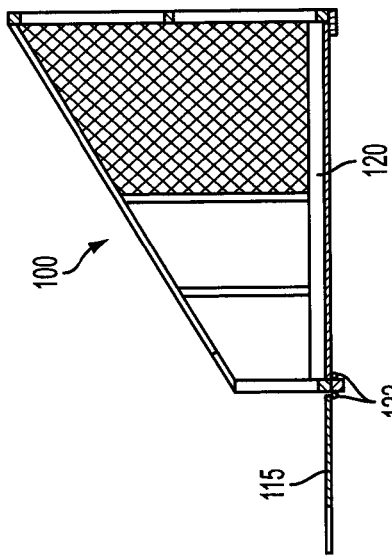
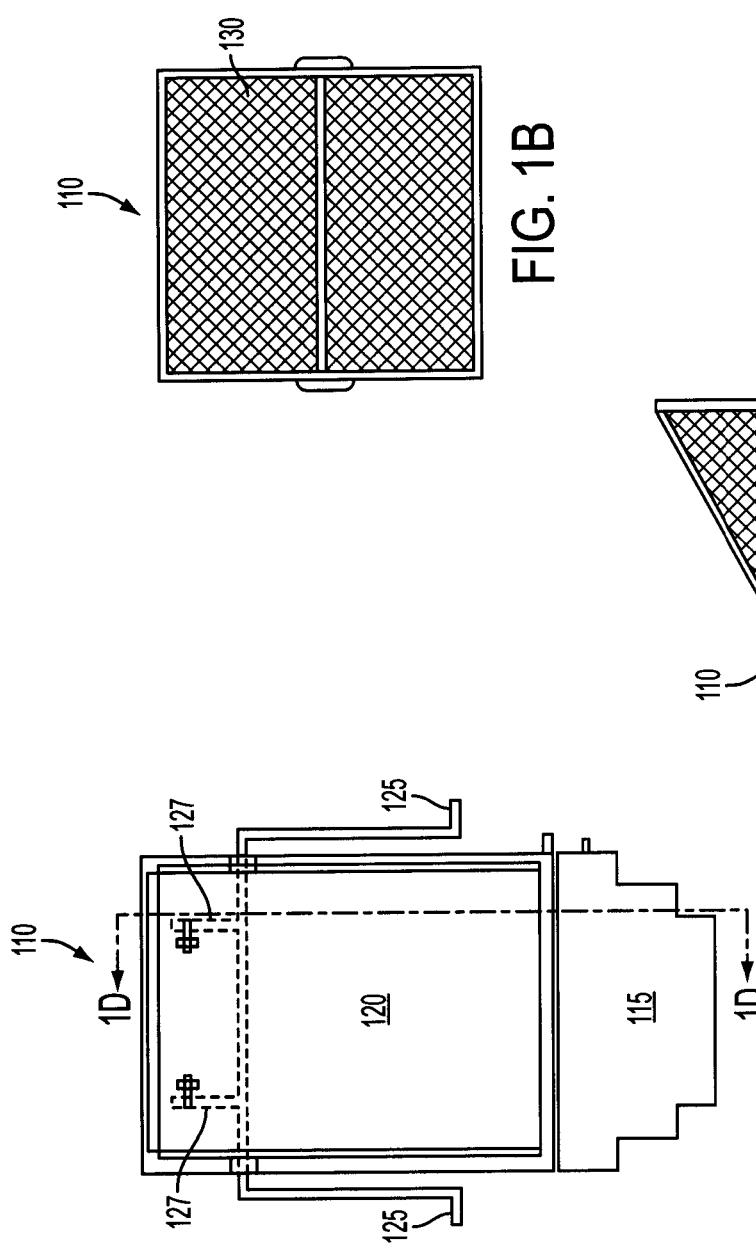
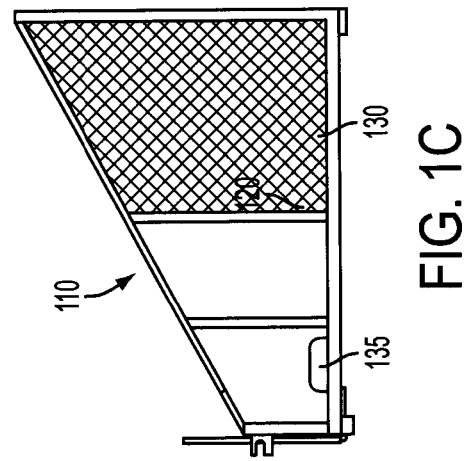

METHOD AND APPARATUS FOR TRANSPORTING A MOTORIZED VEHICLE

RELATED APPLICATION

This application claims priority to a previously U.S. provisional application titled "Method and Apparatus for Transporting a Motorized Vehicle," filed on Sep. 9, 2004 and assigned Ser. No. 60/608,149.

BACKGROUND OF THE INVENTION

1. Field of Invention

This invention generally relates to cargo transport, and particularly to a method and apparatus for safely transferring motorized wheelchairs and scooters between a loading bridge and cargo bin of an aircraft.

2. Description of Related Art

The advent of electric motorized wheelchairs and scooters (generically referred to as "motorized wheelchairs") has enabled persons suffering from physical impairments to achieve greater mobility. Often those who travel via airlines wish to take their motorized wheelchair with them throughout the departure and arrival airport terminal, and particularly up to the point at which they take their seat within the aircraft. In order to accommodate, airline agents must transfer the motorized wheelchair from the loading bridge to the cargo bin of the aircraft at the departure airport and then vice-versa at the arrival airport.

The current procedure for transferring motorized wheelchairs varies by station depending on the airline equipment and facilities available. One common transfer method is to physically carry the motorized wheelchair down an exterior stairs of the loading bridge. This can be dangerous and often causes employee injuries. Airline agents are in an awkward position and the limited confines of the stairwell and unusual step spacing makes this job difficult because of the bulky size and weight of a typical motorized wheelchair. For example, motorized wheelchairs often weigh between 150 and 200 pounds. The risk of injury is increased when fluids, snow, or ice are present on the steps of the exterior stairs. This also increases the risk of damage to the customer's motorized wheelchair.

Another transfer method involves driving the motorized wheelchair from the loading bridge to a building elevator, and then driving the motorized wheelchair from the elevator to a belt loader, which normally loads luggage into the cargo bin of an aircraft. An agent then lifts the motorized wheelchair onto the belt loader and into the bin. This often requires an agent to ride the belt while balancing and/or struggling to move the chair up the belt to the bin. This also requires extra time, as elevators are not always located close to the required gate area and in some stations, the elevator is located on the opposite side of a security checkpoint. The physically impaired passenger may be required to wait extended periods of time to retrieve their motorized wheelchair. Also flights may be delayed waiting for the motorized wheelchair to be loaded onto the aircraft.

Some stations use a forklift with a makeshift basket to move the motorized wheelchair from the loading bridge to the belt loader. This method increases the risk of aircraft ground damage and still requires lifting and struggling to move the chair along the belt loader to/from the bin.

Other stations use a winch on each loading bridge to move the chair up or down the baggage slide along with a pushcart that transfers the chair to/from the belt loader. However, this requires maneuvering the chair on the loading bridge landing, and lifting and struggling to move the chair along the belt loader to/from the bin.

SUMMARY OF THE INVENTION

The present invention overcomes these and other deficiencies by providing a motorized wheelchair retriever apparatus to safely transfer motorized wheelchairs, scooters and other equipment between the loading bridge and aircraft cargo bin in a timely manner.

In at least one embodiment of the invention, an apparatus is disclosed for transferring motorized wheelchairs and other equipment between a loading bridge and cargo bin of an aircraft. The apparatus comprises a metal cage assembly with a drop down ramp at the front and an adjustable floor that is raised by a lever handle on either side, outside of the frame. The apparatus can be attached to an end of aircraft cargo belt loader by a strap that is wrapped around the belt frame and tightened via a ratcheting clamp. The adjustable floor can be raised or lowered at one end to offset the angle of the belt loader when it is raised to an upright position. This allows the floor of the apparatus to be substantially parallel to the loading bridge or aircraft cargo bin, thereby enabling the easy transfer of a motorized wheelchair to and from the retriever apparatus.

According to one embodiment of the invention, a cargo transfer apparatus is provided. The apparatus comprises a frame; an adjustable floor, wherein one side of said adjustable floor is hinged to said frame; a lever arm operably connected to said adjustable floor to position said adjustable floor at one of at least two different angles.

In another embodiment of the invention, a method of transferring a motorized wheelchair is provided. The method comprises the steps of attaching a cage assembly comprising an adjustable floor to an end of a belt loader; loading a motorized wheelchair from a first location into said cage assembly attached to said belt loader; positioning said cage assembly loaded with said motorized wheelchair and attached to said belt loader adjacent to a second location; and unloading said motorized wheelchair from said cage assembly to said second location.

In another embodiment of the invention, a cargo transfer apparatus is provided. The apparatus comprises frame means for receiving an item of cargo; and adjustable floor means for adjusting a floor of the apparatus to offset an angle of a belt loader.

One advantage of exemplary embodiments of the invention is that it facilitates transfer of motorized wheelchairs without requiring a person to lift or carry the motorized wheelchair, thus eliminating injuries to employees, preventing damage to the customer's motorized wheelchair and providing prompt service to physically impaired airline customers. The invention also eliminates struggling to move the motorized wheelchair along a belt loader. Moreover, the invention can provide a timely transfer of motorized wheelchairs, thereby providing improved passenger service and reduced risk of flight delay.

Another advantage of exemplary embodiments of the invention is that it is relatively inexpensive compared to conventional lifting systems.

Another advantage of exemplary embodiments the invention is its straightforward operation by attaching it to existing equipment without modifications and employing manual operation requiring little or no maintenance.

The foregoing, and other features and advantages of the invention, will be apparent from the following, more particular description of the preferred embodiments of the invention and the accompanying drawings.

BRIEF DESCRIPTION OF THE DRAWINGS

For a more complete understanding of the present invention, the objects and advantages thereof, reference is now made to the following descriptions taken in connection with the accompanying drawings in which:

FIG. 1A illustrates a top view of a motorized wheelchair retrieval apparatus according to at least one embodiment of the invention;

FIG. 1B illustrates a back view of a motorized wheelchair retrieval apparatus according to at least one embodiment of the invention;

FIG. 1C illustrates a right side view of a motorized wheelchair retrieval apparatus according to at least one embodiment of the invention;

FIG. 1D illustrates a right side view of a motorized wheelchair retrieval apparatus with a drop down ramp extended according to at least one embodiment of the invention;

DETAILED DESCRIPTION OF PREFERRED EMBODIMENTS

Figure 2B:
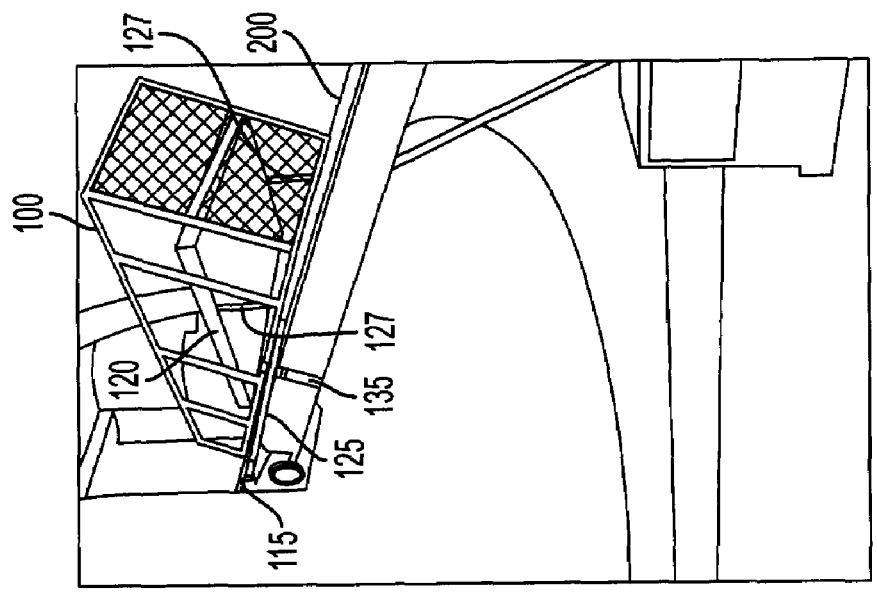
FIG. 2B illustrates an alternate view of the motorized wheelchair retrieval apparatus of FIG. 1 placed atop a belt loader.

Preferred embodiments of the invention and their advantages may be understood by referring to FIGS. 1-4. The invention presents a motorized wheelchair retrieval method and apparatus to safely transfer electric wheelchairs and scooters and other equipment between the loading bridge and aircraft cargo bin in a timely manner. This transfer can be accomplished without an operator having to lift or carry the wheelchair, thus eliminating injuries to employees, preventing damage to the customer's wheelchair, and providing prompt service to physically impaired customers. Although the invention is described in the context of airline travel, the inventive concept is applicable to other transportation means such as, but not limited to, train and sea transportation. Moreover, the invention may be used to transfer objects other than motorized wheelchairs.

FIGS. 1A through D illustrate a motorized wheelchair retrieval apparatus 100 according to an embodiment of the invention. The motorized wheelchair retrieval apparatus 100 comprises a metal cage assembly 110 with a drop down ramp 115 at the front and an adjustable floor 120 that is raised or lowered by a lever arm 125 on either side, outside of the frame. A strut member 127 is attached to the lever arm 125. The ramp 115 and floor 120 are attached at one side to the apparatus 100 via hinges 122. The apparatus 100 is preferably constructed of a lightweight non-corrosive metal such as aluminum. A latch (not shown) can be provided to constrain the ramp 115 in a fixed vertical position.

When the apparatus 100 is placed on a belt loader (not shown), the belt loader driver is protected from objects falling from the wheelchair by a wire cage 130 on the back and side of the apparatus 100. The motorized wheelchair retrieval apparatus 100 is attached to the belt loader by a strap 135 that can be wrapped around the belt frame and tightened via a ratcheting clamp (not shown). The motorized wheelchair retrieval apparatus 100 can be dimensioned accordingly to accommodate various motorized wheelchairs for transfer between the cargo bin and loading bridge.

Figure 2A:
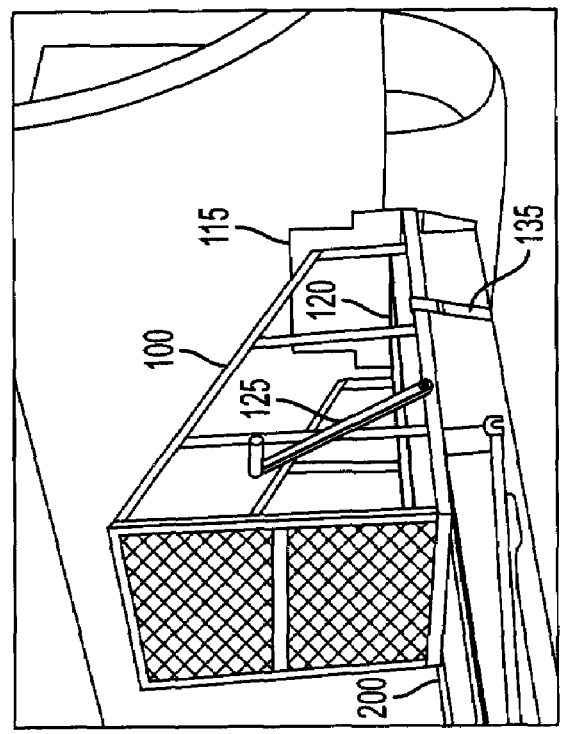
FIG. 2A illustrates the motorized wheelchair retrieval apparatus of FIG. 1 placed atop a belt loader.

The motorized wheelchair retrieval apparatus 100 can be easily moved onto the end of a belt loader. FIG. 2A illustrates the retrieval apparatus 100 placed atop a belt loader 200, which is in a near horizontal (i.e., lowered) position, with the strap 135 tightened around one end of the belt loader closest to the aircraft. As shown in this lowered position, the adjustable floor 120 is parallel with the belt loader and the lever arm 125 is in an upright position. The ramp 115 is shown in an upright vertical position. When the belt loader 200 is raised (e.g., in an approximately 45 degree position) as shown in FIG. 2B, the lever arm 125 can be brought forward toward the front ramp 115 to raise the adjustable floor 120 to a nearly horizontal position as shown. The adjustable floor 120 can be raised by the strut members 127 attached to the lever arm 125. The front ramp 115 is lowered to a horizontal position to bridge the gap between the loader and the aircraft. The positioning of the adjustable floor 120 as shown in these figures allows the adjustable floor to be substantially parallel with the appropriate portion of the aircraft for efficient transfer of a motorized wheelchair (not shown). Preferably, the lever arm 125 raises and lowers the adjustable floor 120 by pure mechanical advantage using strut member 127 with no electric or hydraulics which could break down or require maintenance. Nonetheless, in another embodiment of the invention, electric or hydraulic assistance can be included to raise or lower the adjustable floor 120, particularly in circumstances where the retriever apparatus is employed for the transfer of heavy cargo.

Figure 3:
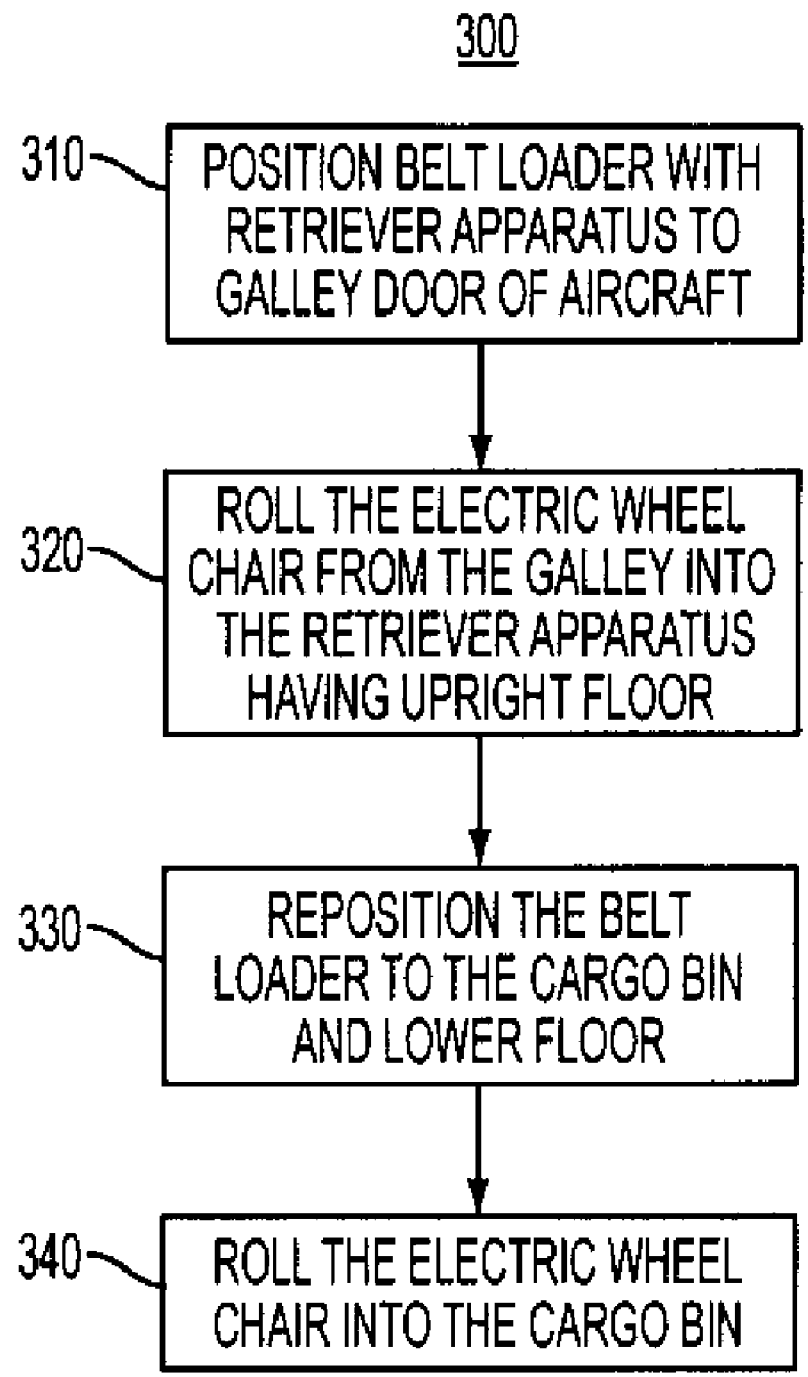
FIG. 3 illustrates a method for transferring a motorized wheelchair from the loading bridge to the cargo bin of an aircraft according to an embodiment of the invention.

Referring to FIG. 3, a method 300 for transferring a motorized wheelchair from the loading bridge to the cargo bin of an aircraft is illustrated according to an embodiment of the invention. When a motorized wheelchair arrives at the aircraft, the belt loader with the retriever apparatus 100 affixed atop is positioned (step 310) to the galley service door of an aircraft. The ramp 115 is unlatched and lowered to bridge the gap between the loader and the aircraft, and the motorized wheelchair is then rolled (step 320) directly into the aircraft entrance door and through the galley onto the belt, inside the cage 130 with the floor 120 in an upright position, and the ramp is then re-latched. The belt loader is then positioned (step 330) to the cargo bin and the ramp is unlatched, and the floor 120 is lowered to its lower position, which is preferably parallel with the floor of the cargo bin. The wheelchair is then rolled (step 340) into the bin. The retriever apparatus 100 eliminates lifting and struggling to move the wheelchair up the belt.

Figure 4:
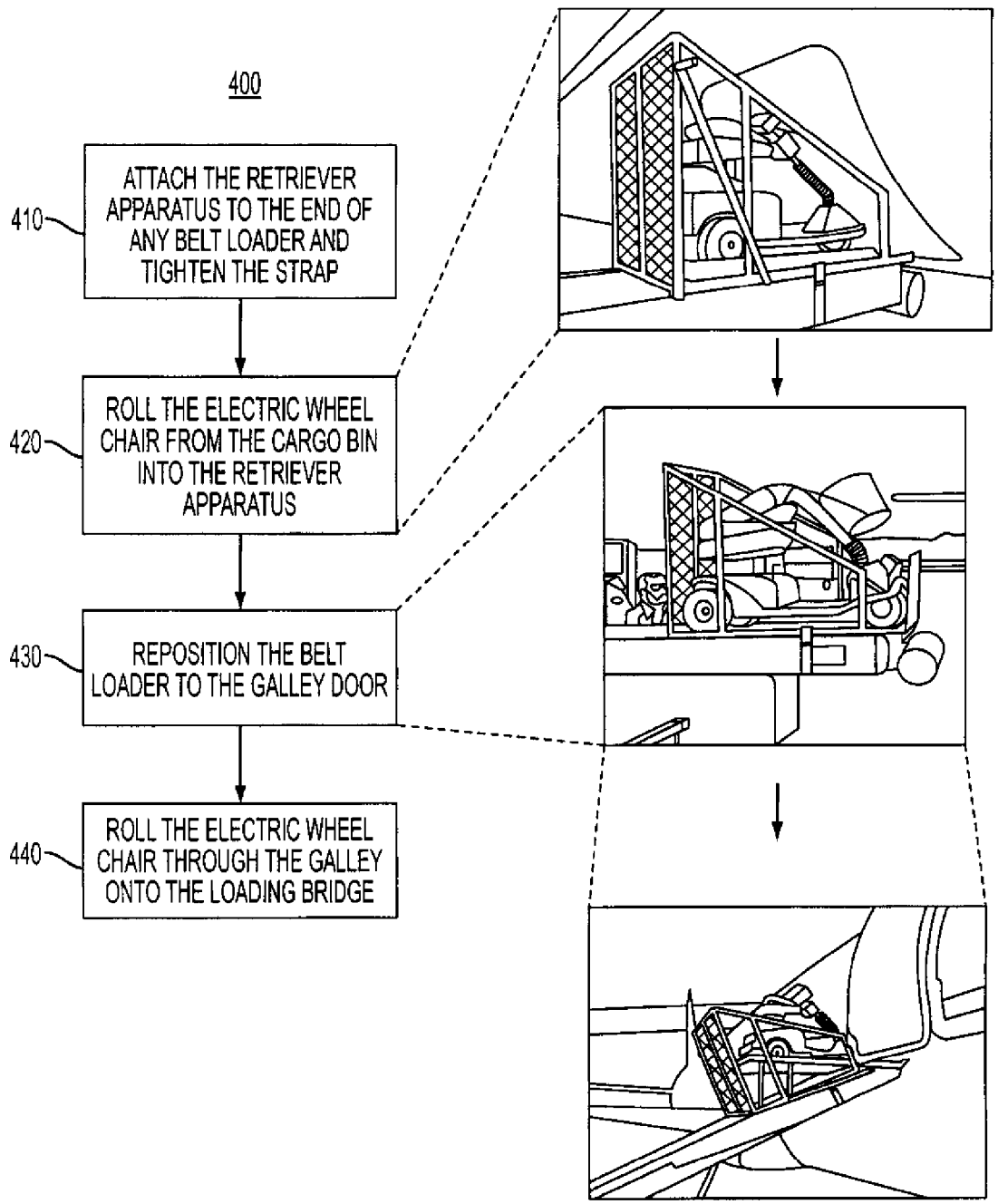
FIG. 4 illustrates a method for transferring a motorized wheelchair from the cargo bin to a loading bridge of an aircraft according to an embodiment of the invention.

FIG. 4 illustrates a method 400 for transferring a motorized wheelchair from the cargo bin to a loading bridge of an aircraft according to an embodiment of the invention. Particularly, the retriever apparatus 100 is attached (step 410) to the end of a belt loader by tightening the strap 135. A motorized wheelchair is rolled (step 420) from the cargo bin into the retriever apparatus and the ramp 115 is raised and latched to secure the wheelchair. The belt loader is repositioned (step 430) to the galley door of the aircraft and the ramp 115 is lowered. The motorized wheel chair is then simply rolled (step 440) through the galley onto the loading bridge and awaits the physically impaired customer when they exit the aircraft.

Hence, the present invention as described herein can eliminate the physical struggle and lifting of motorized wheelchairs during transfer. The present invention requires no costly maintenance and can eliminate the risk of injuries to cargo handlers and damage to motorized wheelchairs.

Figure 5:
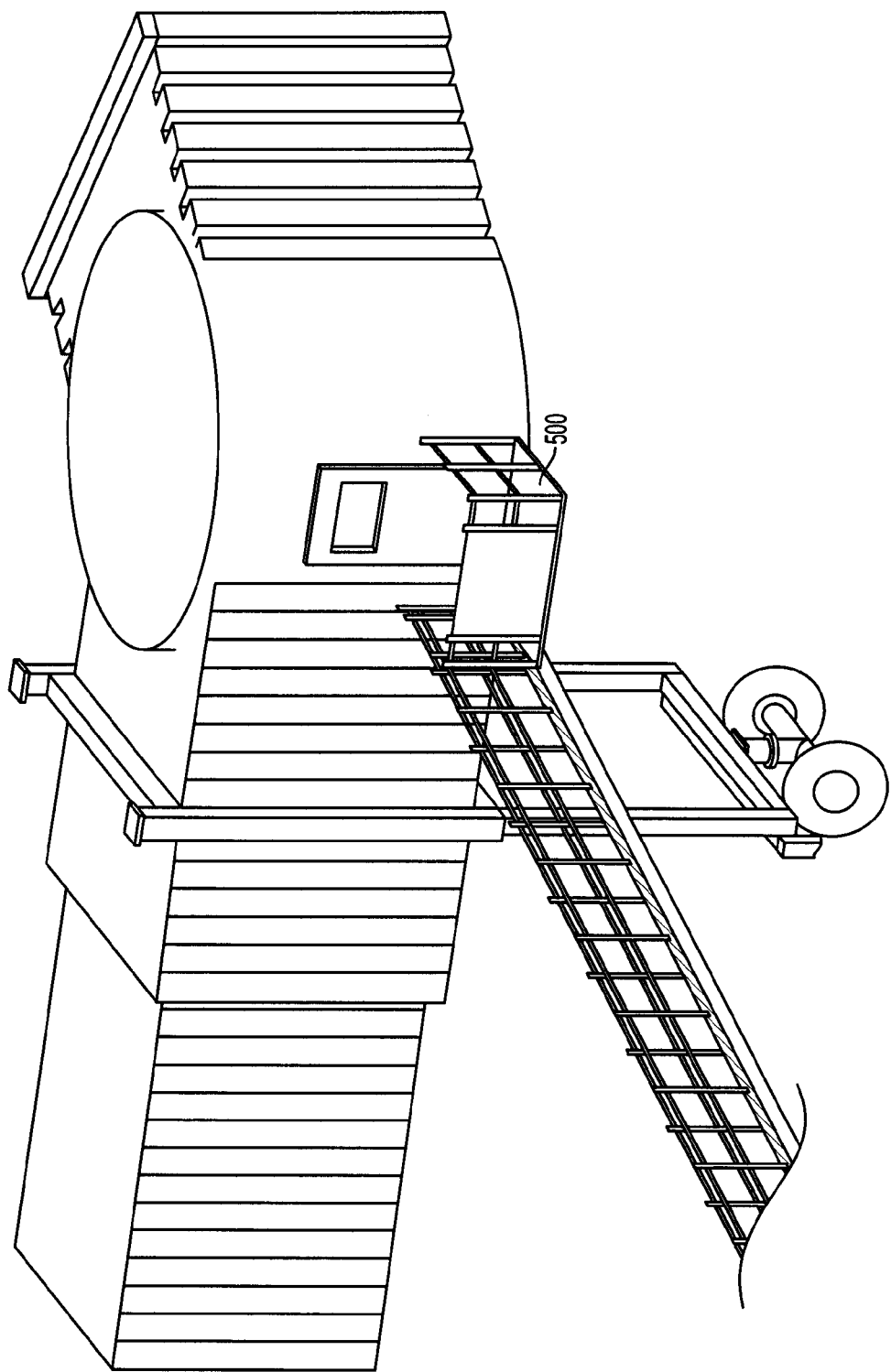
FIG. 5 illustrates a view of a loading bridge showing the loading bridge landing.

The wheelchair can also be loaded by means of the loading bridge landing. For example, the belt loader with the retriever apparatus 100 secured to it can be positioned adjacent to the loading bridge landing 500 as shown in FIG. 5. Typically, the loading bridge landing is a landing at the top of the stairs leading from the tarmac to the loading bridge. The loading bridge landing typically includes a railing. The loading bridge landing also commonly includes a gate on a hinge. The gate can be opened and the retriever apparatus 100 secured to the belt loader can be positioned adjacent to the open gate. In this way, the wheelchair can be easily moved from the loading bridge to the loading bridge landing, through the gate, and onto the retriever apparatus 100. The belt loader and retriever apparatus 100 can then be repositioned at the cargo bin to convey the wheelchair to the cargo bin. This process can be reversed to convey the wheelchair from the cargo bin to the loading bridge landing to the loading bridge after the flight.

Although the invention has been particularly shown and described with reference to several preferred embodiments thereof, it will be understood by those skilled in the art that various changes in form and details may be made therein without departing from the spirit and scope of the invention. For example, the various systems and methods described herein may be used to transport any type of cargo, of any weight, from a first location to a second location.

The invention claimed is:

1. A cargo transfer apparatus comprising:
   a frame that is dimensioned to at least partially enclose a motorized wheelchair;
   an adjustable floor, wherein a first side of the adjustable floor is hinged to the frame and a second side of the adjustable floor is variably positioned relative to the frame;
   a lever arm operably coupled to the adjustable floor to position the adjustable floor at one of at least a first angle relative to the frame and a second angle relative to the frame; and
   means for attaching wherein the frame moves along with the cargo belt loader the cargo transfer apparatus to a cargo belt loader;
   wherein when the cargo belt loader is in a raised position, the adjustable floor is at the first angle relative to the frame and in a generally horizontal position;
   wherein when the cargo belt loader is in a lowered position, the adjustable floor is at the second angle relative to the frame and in a generally horizontal position, and wherein the adjustable floor has a degree of rotational freedom in operation with the cargo belt loader approximate to a degree of rotational freedom of the cargo belt loader for an aircraft.

2. The apparatus of claim 1, wherein the means for attaching comprises a strap.

3. The apparatus of claim 1, further comprising a ramp hinged to the frame proximal to a front side of the frame.

4. The apparatus of claim 3, wherein the ramp is dimensioned to fit inside an aircraft door, a loading bridge landing, or a cargo bin of an aircraft.

5. A method of transferring a motorized wheelchair comprising the steps of:
   attaching a frame to an end of a belt loader, wherein the frame is dimensioned to at least partially enclose the motorized wheelchair and the frame houses an adjustable floor;
   lowering a ramp located at a front portion of the frame;
   adjusting the adjustable floor as required to be substantially parallel to a floor of a first location;
   loading a motorized wheelchair from the first location into the frame attached to the belt loader;
   raising the ramp after loading the motorized wheelchair;
   positioning the frame loaded with the motorized wheelchair and attached to the belt loader adjacent to a second location;
   lowering the ramp;
   adjusting the adjustable floor so as to be substantially parallel to a floor at the second location such that the motorized wheelchair is generally horizontal at the second location; and
   unloading the motorized wheelchair from the frame to the second location,
   wherein the first location is an aircraft door, a loading bridge landing, or a cargo bin of an aircraft and the second location is a cargo bin of an aircraft, an aircraft door, or a loading bridge landing.

6. The method of claim 5 wherein the first location is a loading bridge landing.

* * * * *